(12) United States Patent
Hayakawa et al.

(10) Patent No.: US 11,100,019 B2
(45) Date of Patent: Aug. 24, 2021

(54) SEMICONDUCTOR DEVICE AND BUS GENERATOR

(71) Applicant: RENESAS ELECTRONICS CORPORATION, Tokyo (JP)

(72) Inventors: Yuki Hayakawa, Tokyo (JP); Toshiyuki Hiraki, Tokyo (JP); Sho Yamanaka, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 30 days.

(21) Appl. No.: 16/438,078

(22) Filed: Jun. 11, 2019

(65) Prior Publication Data
US 2019/0391942 A1 Dec. 26, 2019

(30) Foreign Application Priority Data

Jun. 22, 2018 (JP) .............................. JP2018-118689

(51) Int. Cl.
*G06F 13/362* (2006.01)
*G06F 12/14* (2006.01)
(Continued)

(52) U.S. Cl.
CPC ........ *G06F 13/362* (2013.01); *G06F 12/1458* (2013.01); *G06F 13/20* (2013.01); *H04L 12/403* (2013.01)

(58) Field of Classification Search
CPC .. G06F 12/1458; G06F 13/1605; G06F 13/20; G06F 13/362; H04L 12/403
See application file for complete search history.

(56) References Cited

U.S. PATENT DOCUMENTS

2010/0122040 A1* 5/2010 Asai ..................... G06F 13/1663
711/147
2011/0246688 A1* 10/2011 Vaz ..................... G06F 13/1642
710/54

(Continued)

FOREIGN PATENT DOCUMENTS

WO 2017/056132 A1 4/2017

OTHER PUBLICATIONS

Extended European Search Report issued in corresponding European Patent Application No. 19181215.5-1224, dated Nov. 13, 2019.

(Continued)

*Primary Examiner* — David Yi
*Assistant Examiner* — Zubair Ahmed
(74) *Attorney, Agent, or Firm* — McDermott Will & Emery LLP

(57) ABSTRACT

Even under various conditions, stay of request on a bus is eliminated, and memory efficiency can be improved. Each of a master A, a master B, and a master X issues an access request to a memory. A memory controller receives an access request through a bus. A central bus control unit controls output of an access request issued by a master to the memory controller through granting the master an access right to the memory. The central bus control unit manages the number of rights that can be granted, which indicates the number of the access rights that can be granted, based on an access size of an access request issued by the master to which the access right is granted, and performs grant of the access right within a range of the number of rights that can be granted.

13 Claims, 8 Drawing Sheets

(51) Int. Cl.
*G06F 13/20* (2006.01)
*H04L 12/403* (2006.01)

(56) References Cited

U.S. PATENT DOCUMENTS

2012/0072702 A1\* 3/2012 Pierson ............... G06F 12/0811
                                                    712/207
2017/0270063 A1    9/2017 Yamanaka et al.

OTHER PUBLICATIONS

Japanese Notice of Reasons for Refusal issued in corresponding Japanese Patent Application No. 2018-118689, dated Jun. 29, 2021, with English translation.

\* cited by examiner

SEMICONDUCTOR DEVICE AND BUS GENERATOR

CROSS-REFERENCE TO RELATED APPLICATIONS

The disclosure of Japanese Patent Application No. 2018-118689 filed on Jun. 22, 2018 including the specification, drawings and abstract is incorporated herein by reference in its entirety.

BACKGROUND

The present invention relates to a semiconductor device, for example, to a semiconductor device that performs access to a memory.

Further, the present invention relates to a bus generator that generates a bus in the semiconductor device.

International Publication No. 2017/056132 discloses access control in a bus system where a plurality of bus masters is coupled to a common bus. A semiconductor device described in International Publication No. 2017/056132 has a plurality of masters, a memory controller, a bus that couples the plurality of masters with the memory controller, and a central bus control unit. International Publication No. 2017/056132 describes that the central bus control unit monitors a transfer amount of each master and selects a master of an access right grant destination based on a reserved bandwidth, a monitored transfer amount, and the number of rights that can be granted, of each master. In International Publication No. 2017/056132, a request of a master to which no access right is granted is masked in a bus between the memory controller and the master.

In International Publication No. 2017/056132, the central bus control unit receives a buffer release notification from the memory controller when a buffer in the memory controller is released. The central bus control unit decrements the number of rights that can be granted by one every time granting an access right, and increments the number of rights that can be granted by one every time the buffer is released. It is possible to avoid a situation where the buffer becomes full of unprocessed access requests by granting an access right according to a processing condition of the memory controller, and it is possible to avoid a situation where the memory controller cannot accept an access request that requires low latency.

SUMMARY

Here, a data size (access size) of memory access required by the master is not always constant, and an access size of a certain access request may be smaller than an access size of another access request. In general, time required for memory access (access time) varies according to an access size, and the larger the access size, the longer the access time. In International Publication No. 2017/056132, such a variation of access time is not considered, and memory access with low latency and high efficiency may not be realized when the access size of the master is not constant.

The other problems and novel features will become apparent from the description of the present specification and the accompanying drawings.

According to an embodiment, a semiconductor device has an access control unit that performs access control that controls output of an access request issued by a master to a memory controller through granting the master an access right to a memory. The access control unit manages the number of rights that can be granted based on an access size of an access request issued by the master and performs grant of an access right within a range of the number of rights that can be granted.

According to an embodiment, even under various conditions, stay of request on a bus is eliminated, and memory efficiency can be improved.

DETAILED DESCRIPTION

Figure 1:
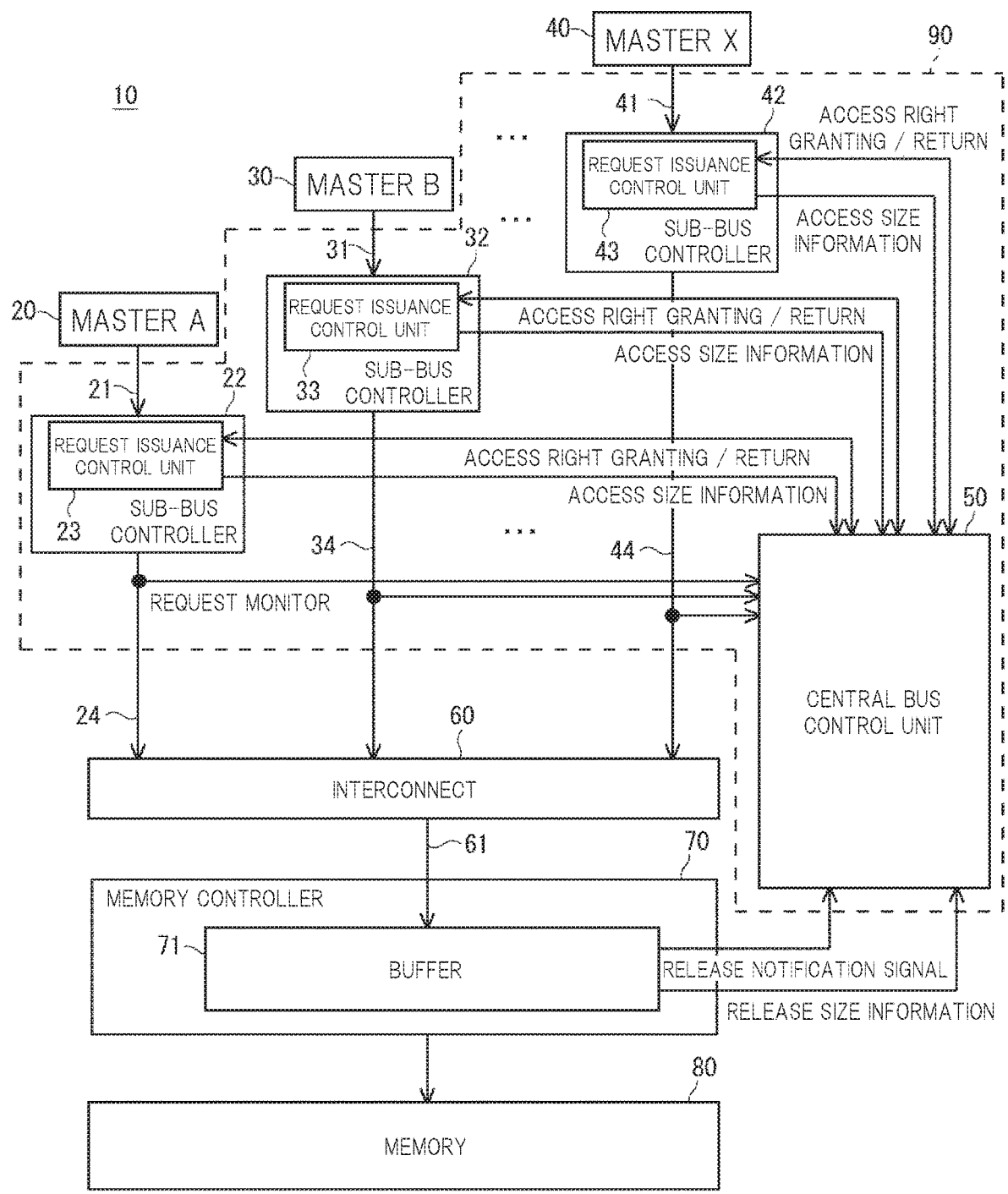
FIG. 1 is a block diagram showing an electronic device including a semiconductor device according to a first embodiment.

In advance of describing embodiments, a process leading to ideas of the embodiments described below will be described. In an actual product having a master that accesses a DDR (Double-Data-Rate) memory, an effective band of bandwidth of the DDR memory varies from about 50% to 70% according to situations, so that its efficiency is desired to be improved. Further, regarding a master that requires real time properties, access latency needs to be short. However, the access latency also varies, so that the access latency needs to be low at all times. When the latency is allowed to some extent, memory access efficiency can be improved by waiting until memory access requests are accumulated to some extent in a memory controller and then performing scheduling to change a processing order of the access requests by considering types (read and write), addresses, and the like of the memory access. However, when prioritizing high-priority requests where low latency is required, it is not possible to wait until access requests of a certain number are accumulated in the memory controller, so that the number of access requests to be scheduled is small. Therefore, efficient memory access cannot be realized and bandwidth efficiency degrades. Therefore, in a memory access system, it is required to respond to these conflicting requests.

As a result of discussion by the inventors, it is found that there is variation in time from when an access right is granted to a master to when a buffer of the memory controller is released, and thereby variation occurs in a band and latency. Further, it is found that there are access size and type of each request as a cause of the variation. In International Publication No. 2017/056132, a data transfer amount between the master and the memory controller is represented by a product of the number of access requests to which an access right is granted and the access size. For example, a data transfer amount when a predetermined number of access rights are granted to an access request whose access size is small is smaller than a data transfer amount when the predetermined number of access rights are granted to an access request whose access size is large. On the other hand, the same number of access rights are granted to an access request whose access size is large, memory access efficiency can be improved. However, access time is long, so that there is a possibility that low latency cannot be realized. The inventors have discussed a bus system that can realize highly efficient memory access with low latency even when the access size is not constant. As a result, the inventors have reached an idea of embodiments described below.

Hereinafter, embodiments where means to solve the above problem is applied will be explained in detail with reference to the drawings. For clarity of the explanation, the description below and the drawings are appropriately omitted and simplified. The components shown in the drawings as functional blocks that perform various processing can be composed of a CPU (Central Processing Unit), a memory, and other circuits as hardware and are realized by a program and the like loaded in a memory as software. Therefore, it should be understood by those skilled in the art that the functional blocks can be realized in various forms by only hardware, only software, or a combination of these, and the functional blocks are not limited to any one of hardware, software, and a combination of these. In the drawings, the same components are denoted by the same reference symbols and redundant description is omitted as appropriate.

The aforementioned program can be stored in various types of non-transitory computer readable media and supplied to a computer. The non-transitory computer readable media include various types of substantial recording media. Examples of the non-transitory computer readable media include a magnetic recording medium (for example, flexible disk, magnetic tape, and hard disk drive), a magneto-optical recording medium (for example, magneto-optical disk), a CD-ROM (Read Only Memory), a CD-R, a CD-R/W, and a semiconductor memory (for example, mask ROM, PROM (Programmable ROM), an EPROM (Erasable PROM), a flash ROM, and a RAM (Random Access Memory)). The program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electrical wire and an optical fiber or a wireless communication path.

The following embodiments will be explained, divided into plural sections or embodiments, if necessary for convenience. Except for the case where it shows clearly in particular, they are not mutually unrelated and one has relationships such as a modified example, an application example, a detailed explanation, and a supplementary explanation of some or entire of another. In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

Further, in the following embodiments, an element (including an operation step etc.) is not necessarily indispensable, except for the case where it is clearly specified in particular and where it is considered to be clearly indispensable from a theoretical point of view, etc. Similarly, in the following embodiments, when shape, position relationship, etc. of an element etc. are referred to, what resembles or is similar to the shape, etc. substantially shall be included, except for the case where it is clearly specified in particular and where it is considered to be clearly not right from a theoretical point of view. This statement also applies to the number of elements, etc. (including the number, a numeric value, an amount, a range, etc.) described above.

First Embodiment

FIG. 1 shows an electronic device including a semiconductor device according to a first embodiment. An electronic device 10 has a master A 20, a master B 30, a master X 40, sub-bus controllers 22, 32, and 42, a central bus control unit 50, an interconnect 60, a memory controller 70, and a memory 80. Among elements of the electronic device 1, for example, the master A 20, the master B 30, the master X 40, the sub-bus controllers 22, 32, and 42, the central bus control unit 50, the interconnect 60, and the memory controller 70 configure the semiconductor device. Among elements of the semiconductor device, for example, the sub-bus controllers 22, 32, and 42, the interconnect 60, and the memory controller 70 can be configured as a hardware circuit. The central bus control unit 50 can be configured as a circuit including a processor.

The master A 20, the master B 30, and the master X 40 issue an access request to the memory 80. The memory 80 is configured as a memory device such as, for example, a DDR-SDRAM (Double-Data-Rate Synchronous Dynamic Random Access Memory). The master A 20, the master B 30, and the master X 40 are bus masters, and for example, configured as processors such as, for example, CPU, GPU (Graphics Processing Unit), and the like. The master A 20, the master B 30, and the master X 40 output access requests through corresponding buses 21, 31, and 41, respectively.

Here, an access request to the memory 80 includes an access type showing read or write, address information of an access destination, information indicating data size (access size). The access size indicates a size of data to be read from the memory 80 or a size of data to be written to the memory 80. The access size includes, for example, 64 bytes, 128 bytes, and 256 bytes.

The master A 20 is coupled to the corresponding sub-bus controller 22 through the bus 21. The sub-bus controller 22 is coupled to the interconnect 60 through a bus 24. The sub-bus controller 22 includes an request issuance control unit 23. The request issuance control unit 23 receives an access request, which the master A 20 issues through the bus 21 and controls, and controls output of the received access request to the bus 24.

The master B 30 is coupled to the corresponding sub-bus controller 32 through the bus 31. The sub-bus controller 32 is coupled to the interconnect 60 through a bus 34. The sub-bus controller 32 includes an request issuance control unit 33. Similarly, the master X 40 is coupled to the corresponding sub-bus controller 42 through the bus 41. The sub-bus controller 42 is coupled to the interconnect 60 through a bus 44. The sub-bus controller 42 includes a request issuance control unit 43.

The request issuance control unit 23 receives an access request from the master A 20. When an access right is granted to the request issuance control unit 23 from the central bus control unit 50, the request issuance control unit 23 outputs the access request issued by the master A 20 to the interconnect 60 through the bus 24. When the request issuance control unit 23 outputs the access request to the interconnect 60, the request issuance control unit 23 outputs information indicating an access size of the access request (hereinafter also referred to as access size information) to the central bus control unit 50. When no access right is granted to the request issuance control unit 23, the request issuance control unit 23 prevents the access request issued by the master A 20 from being outputted to the interconnect 60.

Functions of the request issuance control units 33 and 43 are similar to that of the request issuance control unit 23. When the request issuance control units 23, 33, and 43 are granted with an access right and do not receive an access request from a corresponding master, the request issuance control units 23, 33, and 43 may output an access right return signal to the central bus control unit 50 to return the access right. The central bus control unit 50 can use the returned access right to grant an access right to another request issuance control unit.

The interconnect 60 receives access requests issued by the master A 20, the master B 30, and the master X 40 through the buses 24, 34, and 44. The interconnect 60 is, for example, a bus arbiter, and arbitrates access requests inputted from a plurality of masters. When the interconnect 60 receives access requests from, for example, the master A 20, the master B 30, and the master X 40, the interconnect 60 outputs an access request issued by a master with the highest priority to the memory controller 70 according to priority set to each master. When the interconnect 60 obtains a response to the access request outputted to the memory controller 70, the interconnect 60 selects an access request of a master with the next highest priority and outputs the access request to the memory controller 70.

The memory controller 70 is coupled to the master A 20, the master B 30, and the master X 40 through buses, the interconnect 60, and the like and accesses the memory 80 according to an access request received through the interconnect 60. Although FIG. 1 shows an example where the electronic device 10 has three masters, the number of the masters is not particularly limited. The electronic device 10 only need to have at least one master that issues the memory controller 70 with an access request to the memory 80. When the number of masters is one, the interconnect 60 for arbitration is not required.

The memory controller 70 has a buffer (request buffer) 71. The buffer 71 stores an access request received by the memory controller 70 through the interconnect 60. The buffer 71 has a plurality of entries and is configured to be able to store a plurality of access requests. The memory controller 70 has, for example, a scheduler that selects one of a plurality of access requests stored in the buffer 71, and a memory command generation unit that generates a memory command (command signal) for accessing the memory 80 according to the selected access request, in addition to the buffer 71. When an access request is selected from the buffer 71 and the access request is processed, the memory controller 70 outputs a buffer release notification indicating that the entry of the buffer 71 is released to the central bus control unit 50. Further, the memory controller 70 outputs access size information of the access request that has been stored in the released buffer to the central bus control unit 50 as release access size information.

The central bus control unit 50 performs access control that controls output of access requests issued by each master to the memory controller 70 through granting of access rights to the masters by using the sub-bus controllers 22, 32, and 42. The central bus control unit 50 grants an access right to a master that is an issuance source of an access request received by each request issuance control unit by granting an access right to the request issuance control units 23, 33, and 43. The central bus control unit 50 and the sub-bus controllers 22, 32, and 42 configure an access control unit 90.

For example, a user sets a band of each master in the central bus control unit 50 in advance, and guarantees QoS (Quality of Service) in a certain time (slot). In the present embodiment, it is assumed that a master exists for each access type. For example, a band may be set for each of an access request whose access type is read (hereinafter referred to as a read request) and an access request whose access type is write (hereinafter referred to as a write request). The central bus control unit 50 grants an access right to each of the request issuance control units 23, 33, and 43 according to, for example, a predetermined access control content. The access control content may be the same as that described in International Publication No. 2017/056132. The content described in International Publication No. 2017/056132 is incorporated herein by reference.

The central bus control unit 50 determines whether or not to grant an access right to the request issuance control units 23, 33, and 43 corresponding to each master based on, for example, QoS information set for a read request and a write request of each master. At this time, the central bus control unit 50 may monitor transaction flowing through a bus by a request monitor (transaction monitor signal) acquired from the buses 24, 34 and 44 and grant an access right while performing correction for each slot based on a transfer amount of the transaction. The central bus control unit 50 controls output of a read request and a write request issued by each master to the memory controller 70 through granting of an access right.

The central bus control unit 50 manages the number of rights that can be granted, which indicates the number of access rights that can be granted to a master, based on an access size of an access request issued by the master to which the access right is granted, and performs grant of the access right within a range of the number of rights that can be granted. For example, every time the central bus control unit 50 grants an access right to a master, the central bus control unit 50 decreases the number of rights that can be granted by a weight according to an access size of an access request issued by the master to which the access right is granted. When the central bus control unit 50 receives a buffer release notification from the memory controller 70, the central bus control unit 50 increases the number of rights that can be granted by a weight according to an access size indicated by the release access size information. The weight (its value) for the access size is determined based on, for example, a design and/or a simulation result.

[Central Bus Control Unit]

Figure 2:
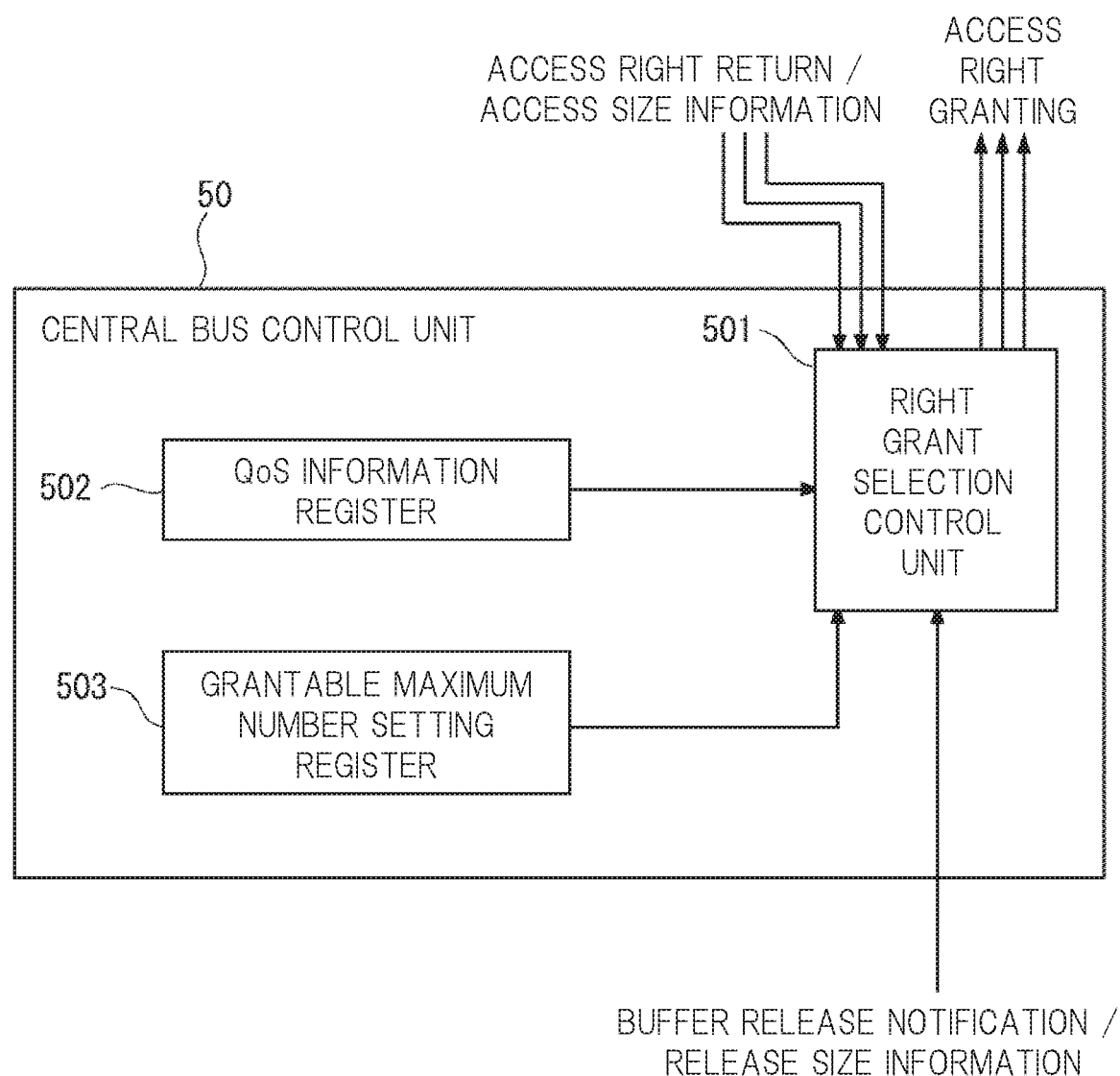
FIG. 2 is a block diagram showing a configuration example of a central bus control unit.

FIG. 2 shows a configuration example of the central bus control unit 50. The central bus control unit 50 has a right grant selection control unit 501, a QoS information register 502, and a grantable maximum number setting register 503. In FIG. 2, the transaction monitor signal shown in FIG. 1 is omitted.

The QoS information register 502 stores QoS information of each master. The QoS information register 502 stores a reserved transfer amount per one sub-slot of each master and a priority level of each master. Here, the sub-slot is, for example, time obtained by dividing a certain time (slot) by a plurality of periods. Alternatively, the QoS information register 502 may store a target transfer amount per one sub-slot of each master.

The right grant selection control unit 501 grants an access right to the request issuance control units 23, 33, and 43 (see FIG. 1). When the right grant selection control unit 501 grants an access right, the right grant selection control unit 501 determines (selects) a request issuance control unit to which an access right is to be granted. The right grant selection control unit 501 determines a request issuance control unit to which an access right is to be granted by using, for example, a reserved bandwidth and a priority level read from the QoS information register 502 and a transfer amount in a sub-slot of each master. Alternatively, the right grant selection control unit 501 may determine a request issuance control unit to which an access right is to be granted by using a target transfer amount read from the QoS information register 502.

The right grant selection control unit 501 outputs an access right grant signal indicating that an access right is acquired to the request issuance control unit to which an access right is to be granted. For example, the right grant selection control unit 501 asserts the access right grant signal to be outputted to the request issuance control unit to which an access right is to be granted and still negates an access right grant signal to be outputted to a request issuance control unit to which an access right is not to be granted. For example, the right grant selection control unit 501 determines a master to which an access right is to be granted for each sub-slot.

The grantable maximum number setting register 503 stores a maximum number of a grantable number of access rights (a maximum number of rights that can be granted), up to which the right grant selection control unit 501 can grant access rights at the same time. The maximum number of rights that can be granted is set to, for example, a number where no access request stays in a bus when the right grant selection control unit 501 grants access rights of the maximum number of rights that can be granted to an access request whose access size is maximum. The right grant selection control unit 501 calculates the number of access rights that can be granted with the maximum number of rights that can be granted that is stored in the grantable maximum number setting register 503 as an upper limit, and performs access right granting within a range of the calculated number of rights that can be granted.

In the present embodiment, the right grant selection control unit 501 manages the number of rights that can be granted based on an access size of an access request issued by each master and the maximum number of rights that can be granted. The right grant selection control unit 501 manages the number of rights where access rights are granted based on the access size (the number of currently granted rights). The right grant selection control unit 501 manages a difference between the maximum number of rights that can be granted set in the grantable maximum number setting register 503 and the number of currently granted rights as a remaining number of rights that can be granted. The right grant selection control unit 501 performs the access right granting within a range of the number of rights that can be granted.

[Privilege Grant Selection Control Unit]

Figure 3:
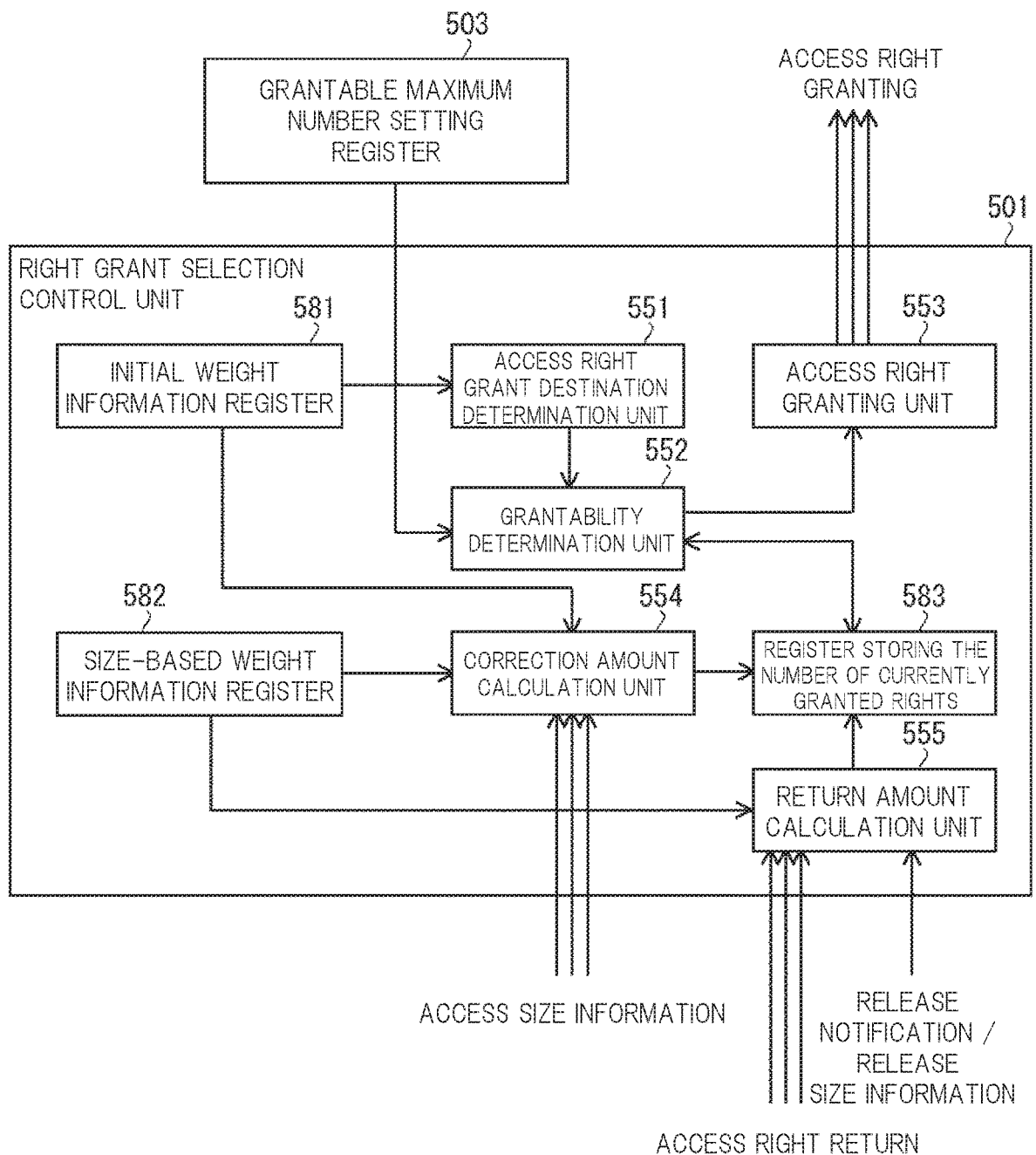
FIG. 3 is a block diagram showing a configuration example of a right grant selection control unit.

FIG. 3 shows a configuration example of the right grant selection control unit 501. The right grant selection control unit 501 has an access right grant destination determination unit 551, a grantability determination unit 552, an access right granting unit 553, a correction amount calculation unit 554, a return amount calculation unit 555, an initial weight information register 581, a size-based weight information register 582, and a register 583 storing the number of currently granted rights. In FIG. 3, signals outputted from the QoS information register 502 and the like in FIG. 2 are omitted.

The initial weight information register 581 stores a master and a weight according to an access size of an access request estimated to be issued by the master in association with each other. For example, the initial weight information register 581 stores the master A 20 and a weight "1" in association with each other, stores the master B 30 and a weight "0.8" in association with each other, and stores the master X 40 and a weight "0.9" in association with each other. The size-based weight information register 582 stores an access size and a weight according to the access size in association with each other. For example, the size-based weight information register 582 stores an access size 256 bytes and a weight "1" in association with each other, stores an access size 128 bytes and a weight "0.9" in association with each other, and stores an access size 64 bytes and a weight "0.8" in association with each other. In the initial weight information register 581 and the size-based weight information register 582, a weight for each master and a weight for each access size are set respectively by using a CPU or the like not shown in the drawings.

The access right grant destination determination unit 551 determines a master to which an access right is granted. The access right grant destination determination unit 551 acquires a weight corresponding to the determined master from the initial weight information register 581. Instead of the initial weight information register 581, an initial size information register that stores a master and an access size of an access request estimated to be issued by the master may be used. In this case, the access right grant destination determination unit 551 may acquire an access size corresponding to the determined master from the initial size information register and acquire a weight corresponding to the acquired access size from the size-based weight information register 582.

The register 583 storing the number of currently granted rights stores the number of granted access rights (the number of currently granted rights). The grantability determination unit 552 refers to the grantable maximum number setting register 503 and the register 583 storing the number of currently granted rights, and determines whether or not an access right can be granted to a master which the access right grant destination determination unit 551 determines as an access right grant destination. More specifically, the grantability determination unit 552 calculates a difference (the number of rights that can be granted) between the maximum number of rights that can be granted stored in the grantable maximum number setting register 503 and the number of currently granted rights stored in the register 583 storing the number of currently granted rights. The grantability determination unit 552 compares the calculated number of rights that can be granted with a weight according to an access size of an access request estimated to be issued by a master determined as an access right grant destination, which is received from the access right grant destination determination unit 551. When the number of rights that can be granted is greater than or equal to the weight received from the access right grant destination determination unit 551, the grantability determination unit 552 determines that an access right can be granted. When the number of rights that can be granted is smaller the weight received from the access right grant destination determination unit 551, the grantability determination unit 552 determines that an access right cannot be granted.

When the grantability determination unit 552 determines that an access right can be granted, the grantability determination unit 552 instructs the access right granting unit 553 to grant an access right to the master determined by the access right grant destination determination unit 551. Further, the grantability determination unit 552 updates the number of currently granted rights by adding the weight received from the access right grant destination determination unit 551 to the number of currently granted rights stored in the register 583 storing the number of currently granted rights. Every time an access right is granted to a master, the grantability determination unit 552 adds a weight according to an access size of an access request estimated to be issued by the master to which the access right is granted to the number of currently granted rights.

In the present embodiment, the number of currently granted rights is weighted by a weight according to an access size. For example, when the number of granted access rights is "10", if all access sizes of access requests are 64 bytes, the number of currently granted rights is 10×0.8=8. When the number of granted access rights is "10" and all access sizes of access requests are 256 bytes, the number of currently granted rights is 10×1=10. In the present embodiment, the number of rights that can be granted, which is represented by a difference between the maximum number of rights that can be granted and the number of currently granted rights, varies according to an access size. When an access right is granted to an access request whose access size is small, the number of rights that can be granted increases as compared with a case when an access right is granted to an access request whose access size is large.

When the request issuance control units 23, 33, and 43 (see FIG. 1) are granted with an access right from the access right granting unit 553 and receive an access request from corresponding masters, the request issuance control units 23, 33, and 43 output an access request to the interconnect 60 by using the granted access right. At this time, the request issuance control units output access size information to the central bus control unit 50. In the central bus control unit 50, the correction amount calculation unit 554 of the right grant selection control unit 501 corrects the number of currently granted rights calculated using the weight that is stored in the initial weight information register 581 when an access right is granted, based on an access size indicated by the access size information outputted from the request issuance control unit. The correction amount calculation unit 554 corrects the number of currently granted rights based on, for example, a difference between a weight according to an access size of an access request estimated to be issued by a master, which is stored in the initial weight information register 581, and a weight according to an access size notified from the request issuance control unit.

More specifically, for example, if the master A 20 is an access right grant destination, when granting an access right, the grantability determination unit 552 adds a weight "1" stored in the initial weight information register 581 to the number of currently granted rights. When an access size of an access request actually issued by the master A 20 is 128 bytes, the request issuance control unit 23 notifies the correction amount calculation unit 554 of access size information 128 bytes. The correction amount calculation unit 554 acquires a weight "0.9" corresponding to 128 bytes from the size-based weight information register 582 and corrects the number of currently granted rights by a difference between the acquired weight "0.9" and the weight "1" stored in the initial weight information register 581. In this case, the weight corresponding to the estimated access size is greater than a weight corresponding to an actual access size, so that the number of currently granted rights is decreased by a difference "0.1" between the weights. When the weight corresponding to the estimated access size is smaller than the weight corresponding to the actual access size, the number of currently granted rights is increased by a difference between the weights. By doing so, it is possible to manage the number of currently granted rights by a weight according to an access size of an access request actually issued by a master.

On the other hand, when the request issuance control units 23, 33, and 43 are granted with an access right from the access right granting unit 553 and do not receive an access request from corresponding masters, the request issuance control units 23, 33, and 43 return the granted access right to the central bus control unit 50 without using the access right. The request issuance control units may return the access right to the central bus control unit 50 by asserting a dedicated access right return signal or may return the access right by outputting access size information "0". In the central bus control unit 50, when the access right is returned, the return amount calculation unit 555 of the right grant selection control unit 501 subtracts the weight stored in the initial weight information register 581 from the number of currently granted rights to which the weight stored in the initial weight information register 581 is added when the access right is granted. By doing so, when the access right is returned, it is possible to restore the number of currently granted rights to a state before the access right is granted. The returned access right can be used as an access right for another master.

When an memory access based on an access request stored in the buffer 71 is processed and an entry of the buffer 71 is released, the memory controller 70 (see FIG. 1) outputs a release notification signal to the central bus control unit 50. Further, the memory controller 70 outputs release size information indicating an access size of the processed access request to the central bus control unit 50. In the central bus control unit 50, when the return amount calculation unit 555 receives the release notification signal, the return amount calculation unit 555 subtracts a weight according to the access size indicated by the release size information from the register 583 storing the number of currently granted rights. By doing so, it is possible to grant an access right used for an access request whose processing is completed to another access request.

[Operation Procedure]

Figure 4:
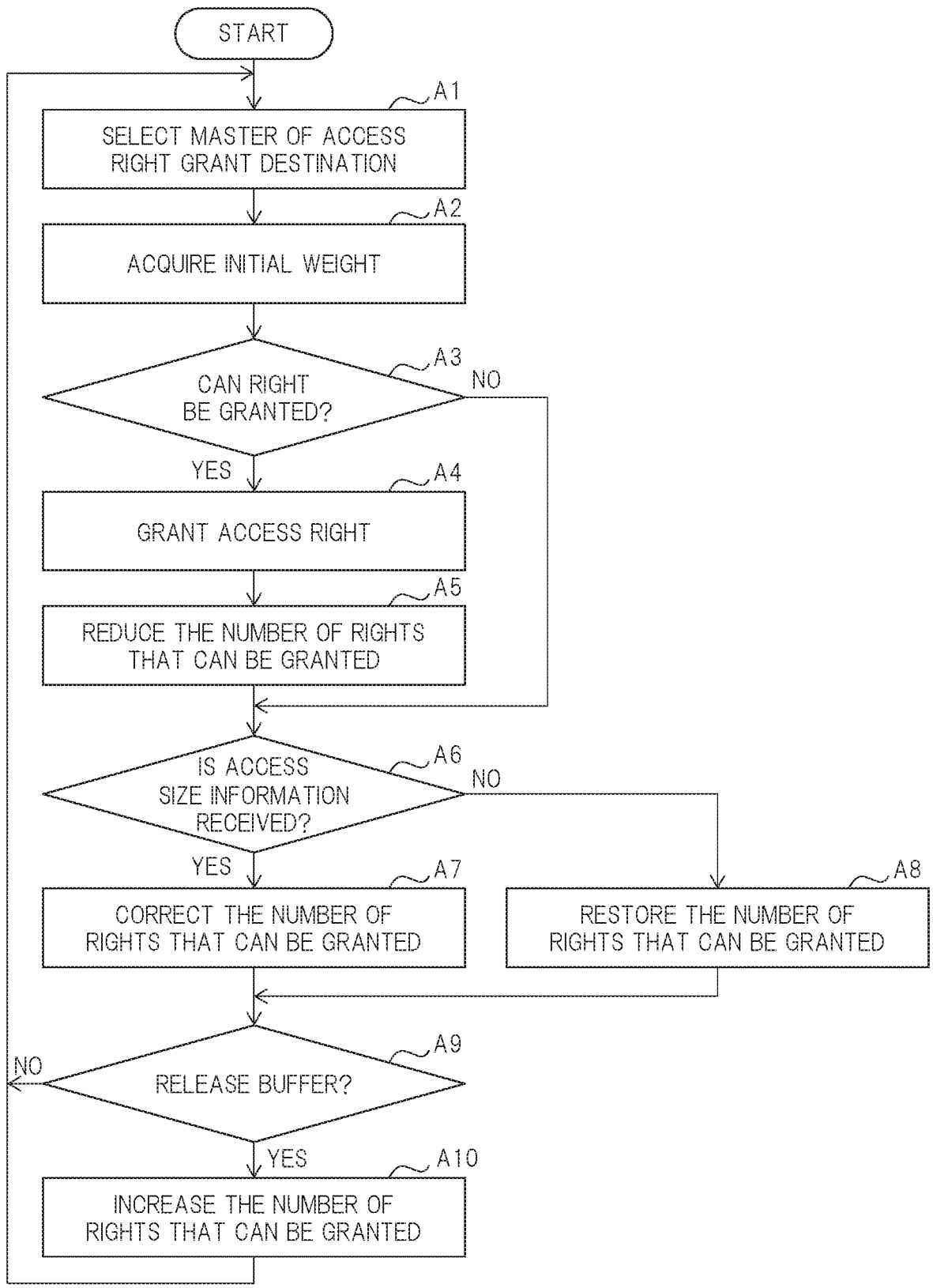
FIG. 4 is a flowchart showing an operation procedure of apart related to management of the number of rights that can be granted.

Next, an operation procedure will be described. FIG. 4 shows an operation procedure of a part related to management of the number of rights that can be granted. Before operating the electronic device 10, necessary information is set in the initial weight information register 581 and the size-based weight information register 582 (see FIG. 3). In the initial weight information register 581, a weight corresponding to an access size in one memory access (access request) expected (estimated) for each master is set for each master. In the size-based weight information register 582, a weight is set for each access size. The weights set in the initial weight information register 581 and the size-based weight information register 582 represent the number of access rights consumed by an access request of each master and each access size.

The access right grant destination determination unit 551 determines a master (request issuance control unit) of access right grant destination (step A1). The access right grant destination determination unit 551 acquires a weight corresponding to the master of access right grant destination determined in step A1 from the initial weight information register 581 (step A2). The access right grant destination determination unit 551 transmits the acquired weight to the grantability determination unit 552.

The grantability determination unit 552 determines whether or not an access right can be granted to the master determined in step A1 based on the weight received from the access right grant destination determination unit 551, the maximum number of rights that can be granted stored in the grantable maximum number setting register 503, and the number of currently granted rights stored in the register 583 storing the number of currently granted rights (step A3). In step A3, for example, the grantability determination unit 552 determines whether or not the number of rights that can be granted that is obtained by subtracting the number of currently granted rights from the maximum number of rights that can be granted is greater than or equal to the weight received from the access right grant destination determination unit 551. When the number of rights that can be granted is greater than or equal to the weight received from the access right grant destination determination unit 551, the grantability determination unit 552 determines that an access right can be granted. When the number of rights that can be granted is smaller than the weight received from the access right grant destination determination unit 551, the grantability determination unit 552 determines that an access right cannot be granted.

When the grantability determination unit 552 determines that an access right can be granted in step A3, the grantability determination unit 552 instructs the access right granting unit 553 to grant an access right. When the access right granting unit 553 is instructed to grant an access right by the grantability determination unit 552, the access right granting unit 553 grants an access right to the master determined in step A1 (step A4). When the access right is granted to the master determined in step A1, the grantability determination unit 552 decreases the number of access rights that can be granted by the weight received from the access right grant destination determination unit 551 (step A5). In step A5, for example, the access right grant destination determination unit 551 decreases the number of access rights that can be granted by adding the weight received from the access right grant destination determination unit 551 to the number of currently granted rights stored in the register 583 storing the number of currently granted rights. In step A3, when the number of rights that can be granted is determined to be smaller than the weight received from the access right grant destination determination unit 551, the granting of access right is suspended. When the number of rights that can be granted varies and becomes greater than or equal to the weight received from the access right grant destination determination unit 551, the granting of access right is performed.

A master outputs an access request to the request issuance control unit of a corresponding sub-bus controller. When the request issuance control unit is granted with an access right and receives an access request from the master, the request issuance control unit outputs the access request to the interconnect 60. At this time, the request issuance control unit transmits access size information indicating an access size of the access request outputted to the interconnect 60 to the central bus control unit 50. When the request issuance control unit is granted with an access right and does not receive an access request from the master, the request issuance control unit returns the granted access right to the central bus control unit 50.

The correction amount calculation unit 554 determines whether or not access size information is received from a request issuance control unit corresponding to a master to which an access right is granted (step A6). When the correction amount calculation unit 554 receives the access size information, the correction amount calculation unit 554 corrects the number of rights that can be granted, which is decreased in step A5, based on an access size indicated by the access size information (step A7). In step A7, the correction amount calculation unit 554 acquires a weight corresponding to the access size indicated by the access size information from the size-based weight information register 582 and calculates a difference between the acquired weight and the weight acquired in step A2. The correction amount calculation unit 554 corrects the number of rights that can be granted by increasing or decreasing the number of currently granted rights stored in the register 583 storing the number of currently granted rights by the calculated difference between the weights. When the calculated difference between the weights is zero, the number of rights that can be granted is not corrected.

When the correction amount calculation unit 554 determines that the access size information is not received, the return amount calculation unit 555 receives an access right return signal from the request issuance control unit. In this case, the return amount calculation unit 555 restores the number of rights that can be granted, which is decreased in step A5 (step A8). In step A8, the return amount calculation unit 555 increases the number of rights that can be granted by the weight acquired in step A2 by decreasing the number of currently granted rights stored in the register 583 storing the number of currently granted rights by the weight acquired in step A2.

The access request outputted from the request issuance control unit is arbitrated by the interconnect 60 and stored in the buffer 71 of the memory controller 70. The memory controller 70 performs memory access to the memory 80 according to the access request stored in the buffer 71. When the memory access based on the access request is completed, the memory controller 70 releases the entry of the buffer 71. At this time, the memory controller 70 transmits a release notification signal to the central bus control unit 50. Further, the memory controller 70 notifies the central bus control unit 50 of release size information indicating a released access size of the access request.

The return amount calculation unit 555 determines whether or not the release notification signal is received from the controller (step A9). When the return amount calculation unit 555 determines that the release notification signal is received, the return amount calculation unit 555 increases the number of rights that can be granted by a weight corresponding to the access size indicated by the release size information outputted from the memory controller 70 (step A10). In step A10, the return amount calculation unit 555 acquires the weight corresponding to the access size indicated by the release size information from the size-based weight information register 582. The return amount calculation unit 555 increases the number of rights that can be granted by the weight corresponding to the access size indicated by the release size information by decreasing the number of currently granted rights stored in the register 583 storing the number of currently granted rights by the weight acquired from the size-based weight information register 582.

[Conclusion]

In the present embodiment, the central bus control unit 50 manages the number of rights that can be granted based on an access size of an access request to which an access right is granted. For example, when the central bus control unit 50 grants an access right to a certain master, the central bus control unit 50 weights the number of rights consumed by the granted access right by a weight according to the access size. For example, when the greater the access size, the greater the weight is set, the number of consumed rights of an access right granted to an access request whose access size is small is smaller than the number of rights of an access right granted to an access request whose access size is large. In this way, by making difference in the number of consumed rights according to the access size, it is possible to increase the remaining number of rights that can be granted, which are not consumed, when there are many access requests whose access size is small, so that it is possible to grant an access right to a greater number of access requests. On the other hand, when there are many access requests whose access size is large, it is possible to decrease the remaining number of rights that can be granted, which are not consumed, so that it is possible to suppress excessive granting of access rights to access requests.

An access request whose access size is small accesses the memory 80 for a short time, so that a staying time in the buffer 7 is short. On the other hand, an access request whose access size is large accesses the memory 80 for a long time, so that a staying time of the access request in the buffer 7 is long. In the present embodiment, a weight according to an access size is used, and the number of access rights consumed by an access request is controlled according to the access size. By doing so, it is possible to dynamically control the number of grantable access rights according to the length of the staying time of the access request in the buffer 71, so that it is possible to eliminate stay of access request on a bus and improve memory efficiency under various conditions.

Comparing with International Publication No. 2017/056132, all the numbers of consumed rights of an access right is "1" in the International Publication No. 2017/0561. For example, in the International Publication No. 2017/056132, when the maximum number of rights that can be granted that is stored in a grantable maximum number setting register is 32, a central bus control unit grants an access right to 32 access requests regardless of access size. Time required for memory access varies according to access size, and for example, the time required for memory access of access size of 64 bytes is shorter than the time required for memory access of access size of 256 bytes. When an access size of an access request stored in a buffer of a memory controller is 64 bytes, the buffer is released earlier than a case where the access request stored in the buffer is 256 bytes. However, in International Publication No. 2017/056132, when 32 access rights are granted, no new access right is granted until the buffer is actually released. There is a time lag from when an access right is granted to when an access request is actually stored in the buffer. Therefore, in International Publication No. 2017/056132, when there are many access requests whose access size is small, memory access is promptly completed, so that there is a possibility that a period of time in which an empty space occurs in the buffer is long.

On the other hand, in the present embodiment, for example, a weight when the access size is 64 bytes is set to 0.8, a weight when the access size is 128 bytes is set to 0.9, and a weight when the access size is 256 bytes is set to 1. In the present embodiment, for example, when all the access sizes are 64 bytes, 40 access rights can be granted with respect to the maximum number of rights that can be granted "32". When the all the access sizes are 256 bytes, access rights, the number of which is the same as the maximum number of rights that can be granted "32", can be granted. In the present embodiment, when the maximum number of rights that can be granted is set to a value where no access right stays in a bus for an access request of maximum access size 256 bytes, access rights, the number of which exceeds the maximum number of rights that can be granted, can be granted for access requests of 64 bytes and 128 bytes, where the time required for memory access of is short. By doing so, when the access size is small, it is possible to shorten a period of time in which an empty space occurs in the buffer by increasing the number of granted access rights and improve memory efficiency. On the other hand, when access size is large, excessive granting of access rights is suppressed, and it is possible to suppress stay of access request in a bus.

In the present embodiment, there is also an effect that a balance between an operation placing emphasis on efficiency and an operation improving latency can be adjusted by adjusting a weight according to an access size. For example, when prioritizing memory efficiency, it is possible to increase the number of access rights that can be granted to an access request whose access size is small by setting a weight for an access request whose access size is small to a small value, so that it is possible to realize an operation placing emphasis on memory efficiency. On the other hand, when setting a weight for an access request whose access size is small to a value close to 1, it is possible to suppress increase of the number of access rights that can be granted to an access request whose access size is small, so that it is possible to lower a possibility that an access request stays in a bus and realize an operation placing emphasis on improvement of latency.

Second Embodiment

Figure 5:
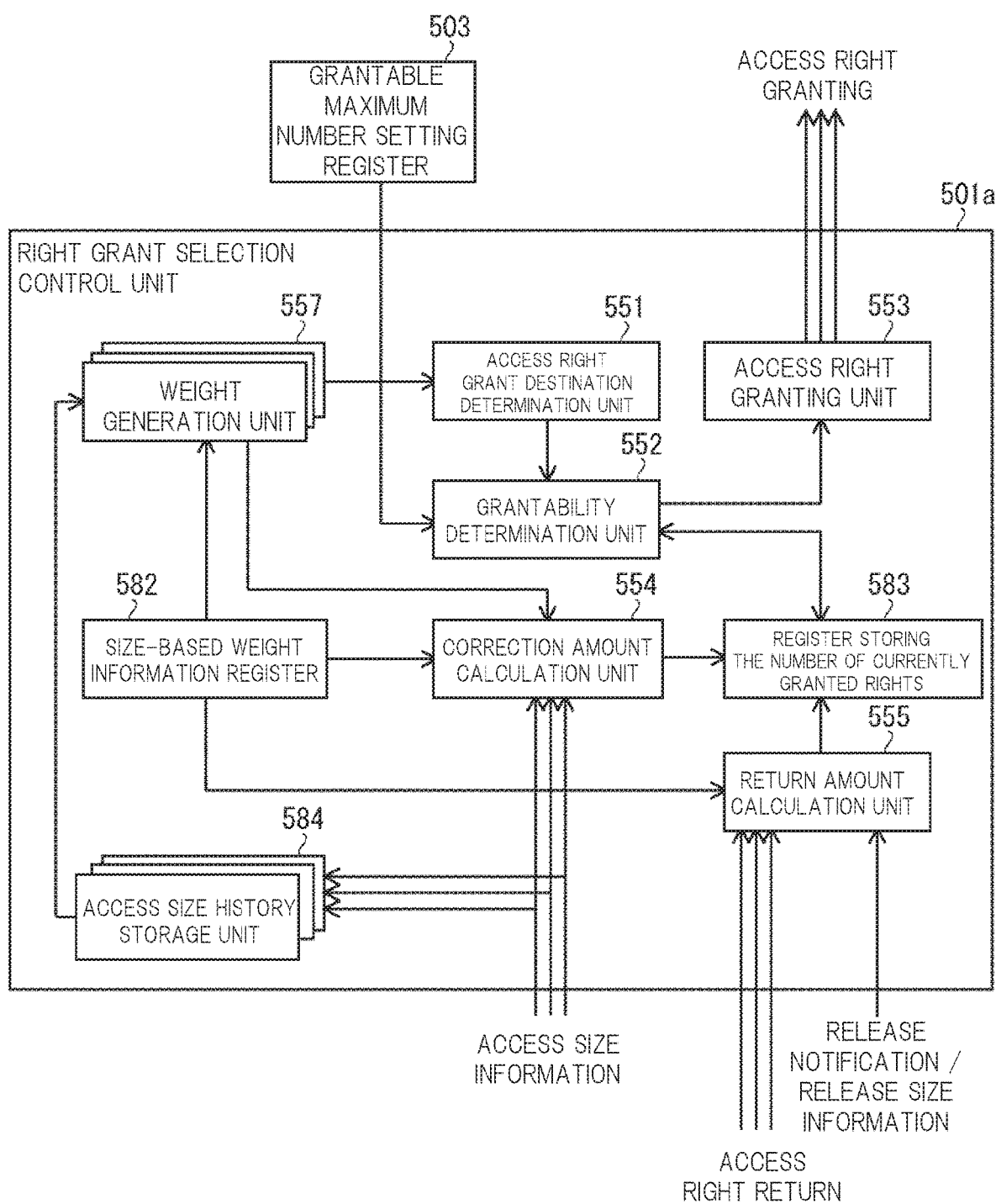
FIG. 5 is a block diagram showing a configuration example of a right grant selection control unit used in an electronic device including a semiconductor device according to a second embodiment.

Next, a second embodiment will be described. FIG. 5 shows a configuration example of aright grant selection control unit used in an electronic device according to the second embodiment. In the present embodiment, a configuration of the electronic device may be the same as that shown in FIG. 1. A configuration of a central bus control unit may be the same as that shown in FIG. 2. A right grant selection control unit 501a used in the present embodiment has a configuration where access size history storage units 584 are added to the configuration of the right grant selection control unit 501 used in the first embodiment shown in FIG. 3. Further, the initial weight information register 581 in the right grant selection control unit 501 is replaced by weight generation units 557. The other points may be the same as those of the first embodiment.

The access size history storage unit 584 stores a history of access size information notified from a request issuance control unit. The weight generation unit 557 refers to the access size history storage unit 584 and generates a weight according to an access size of an access request estimated to be issued by a master based on the history of access size information stored in the access size history storage unit 584. For example, the weight generation units 557 and the access size history storage units 584 are arranged respectively corresponding to a plurality of masters included in the electronic device 10. The access size history storage unit 584 corresponding to each master stores a history of access size information notified from the request issuance control unit corresponding to the master. The weight generation unit 557 corresponding to each master refers to the access size history storage unit 584 corresponding to the master, and generates a weight according to an access size of an access request estimated to be issued by the master.

When the request issuance control units 23, 33, and 43 (see FIG. 1) respectively output access requests issued by the master A 20, the master B 30, and the master X 40 to the interconnect 60, the request issuance control units 23, 33, and 43 output access size information to the central bus control unit 50. For example, the access size history storage unit 584 stores a predetermined number of pieces of access size information for each master. The number of pieces of the access size information stored in the access size history storage unit 584 is not particularly limited, but the number is set to five for example.

The weight generation unit 557 estimates an access size of an access request next issued by a master based on, for example, a history of access size information stored in the access size history storage unit 584. For example, the weight generation unit 557 statistically processes five pieces of access size information by a predetermined statistical method and then estimates an access size of an access request next issued by the master. For example, the weight generation unit 557 uses an average value of access sizes indicated by most recent five pieces of access size information as an estimate value of an access size of an access request next issued by the master. Alternatively, the weight generation unit 557 may use a value calculated from the average value by using a predetermined calculation formula as an estimate value of an access size of an access request next issued by the master. Further, the weight generation unit 557 may use an access size indicated by the most recent one of the five pieces of access size information as an estimate value of an access size of an access request next issued by the master. The access size estimation method in the weight generation unit 557 may be configured to be switchable by using, for example, a register or the like not shown in the drawings.

The weight generation unit 557 generates a weight corresponding to the estimated access size. In the weight generation unit 557, for example, the same weight as that set in the initial weight information register 581 (see FIG. 3) may be set as an initial value. When the access right grant destination determination unit 551 determines a master of access right grant destination, the access right grant destination determination unit 551 acquires a weight corresponding to an estimate value of an access size of an access request next issued by the master. When granting an access right, the grantability determination unit 552 updates the number of currently granted rights stored in the register 583 storing the number of currently granted rights by using a weight acquired from the weight generation unit 557.

When the correction amount calculation unit 554 receives access size information from a request issuance control unit to which an access right is granted, the correction amount calculation unit 554 corrects the number of currently granted rights stored in the register 583 storing the number of currently granted rights based on a difference between a weight added to the register 583 storing the number of currently granted rights when the access right is granted and a weight corresponding to an access size indicated by the access size information. Further, when an access right is returned from a request issuance control unit to which the access right is granted, the return amount calculation unit 555 subtracts a weight added to the register 583 storing the number of currently granted rights when the access right is granted from the number of currently granted rights stored in the register 583 storing the number of currently granted rights.

Here, there is a predetermined time difference from timing when the right grant selection control unit 501a grants an access right to the request issuance control unit to timing when the right grant selection control unit 501a receives access size information from the request issuance control unit. Further, there is a predetermined time difference from timing when the right grant selection control unit 501a grants an access right to the request issuance control unit to timing when the right grant selection control unit 501a receives an access right return signal from the request issuance control unit. To adjust the time differences, the correction amount calculation unit 554 and the return amount calculation unit 555 may receive a weight generated by the weight generation unit 557 through a FIFO (First In, First Out) or the like that delays data for a predetermined time. In this case, even when the weight generated by the weight generation unit 557 changes during a period between the grant of access right and the reception of access size information, the correction amount calculation unit 554 can correct the number of currently granted rights by using the weight used when the access right is granted. Further, the return amount calculation unit 555 can increase the number of currently granted rights by the weight used when the access right is granted.

[Conclusion]

In the present embodiment, the weight generation unit 557 estimates an access size of an access request issued by a master based on an access size of an actually generated access request and generates a weight when an access right is granted. It is possible to more correctly estimate an access size of an access request issued by a master by using history information of access size, and it is possible to prevent degradation of latency and degradation of memory efficiency by using a weight according to the estimated access size.

Third Embodiment

Figure 6:
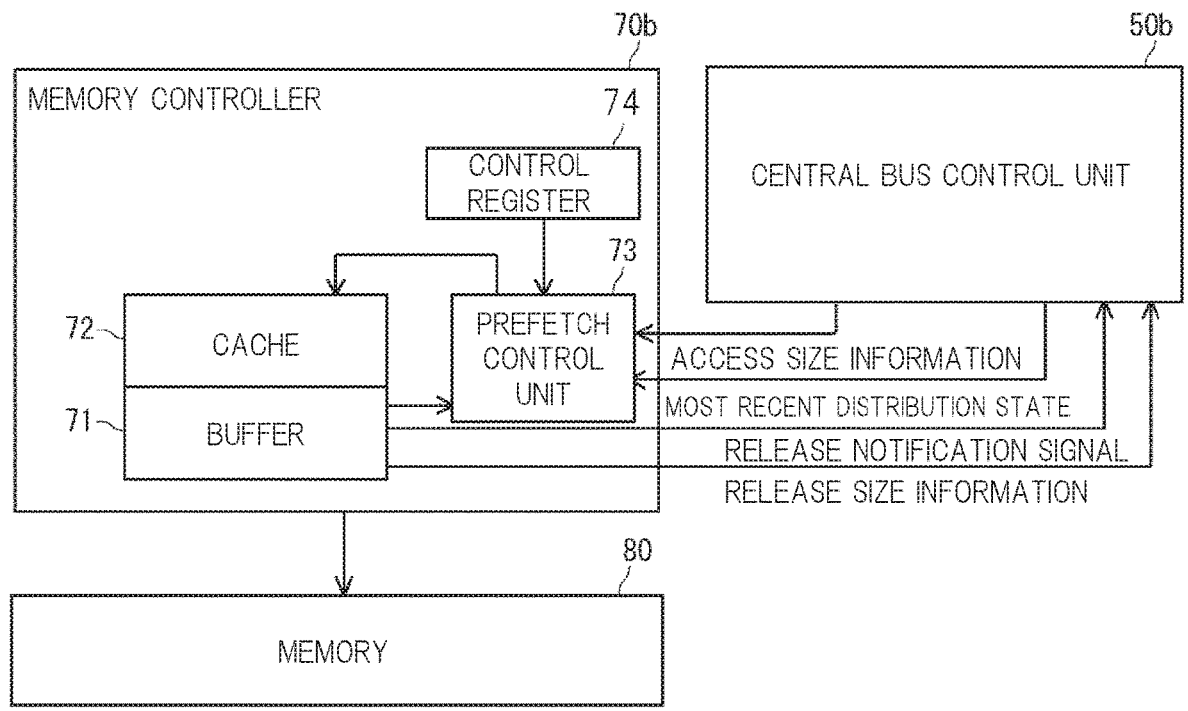
FIG. 6 is a block diagram showing a memory controller used in an electronic device including a semiconductor device according to a third embodiment.

Subsequently, a third embodiment will be described. FIG. 6 shows a memory controller used in an electronic device according to the third embodiment. In the present embodiment, a configuration of the electronic device may be the same as that shown in FIG. 1. A configuration of a central bus control unit may be the same as that shown in FIG. 2. In the present embodiment, a memory controller 70b has a cache 72, a prefetch control unit 73, and a control register 74 in addition to the buffer 71. The other points may be the same as those of the first embodiment or the second embodiment.

During memory access to the memory 80, when the memory controller 70b reads the memory 80, the memory controller 70b reads (prefetches) extra data in addition to data of an actual access size and stores both data in the cache 72, so that when the extra data is read (read hit), the memory 80 is not read. Thereby, it is possible to reduce latency. However, when the prefetched data is not used or the data is expelled from the cache before being used, the prefetched data is wasted and access efficiency to the memory 80 is degraded. In the present embodiment, the memory controller 70b controls prefetch based on information such as QoS.

The prefetch control unit 73 of the memory controller 70b determines whether or not to perform prefetch when reading the memory 80. The control register 74 stores information identifying a master to be an object of prefetch and a maximum access size when prefetch is performed. The prefetch is effective when an access request to continuous addresses occurs, and whether or not the prefetch is effective is determined according to characteristics of memory access. In the control register 74, a master that generates an access request to continuous addresses is set as a prefetch master. The prefetch control unit 73 determines whether or not to perform prefetch for the master stored in the control register 74 as the prefetch master. When the prefetch control unit 73 performs prefetch, the prefetch control unit 73 temporarily stores prefetched data in the cache 72. When the access type of the access request is read, the prefetch control unit 73 improves efficiency of memory access by using access size information to read-ahead the cache 72.

More specifically, the prefetch control unit 73 acquires the access size information from a central bus control unit 50b and estimates an access size next issued by the prefetch master. Further, the prefetch control unit 73 determines whether or not the prefetch master will issue many access requests based on setting information of QoS in the QoS information register 502 (see FIG. 2) and grant information most recent to an access right. The prefetch control unit 73 checks masters of issuance source of access requests stored in the buffer 71 and checks how many access requests issued by masters different from the prefetch master are stored in the buffer 71. The prefetch control unit 73 determines whether or not to perform prefetch by comprehensively examining a most recent access size of each master, the next band of the prefetch master estimated from QoS setting, bands of the other masters estimated from the QoS setting, the number of access requests issued by the prefetch master and stored in the buffer 71, and the number of access requests issued by the other masters and stored in the buffer 71.

For example, when a large number of access requests issued by the prefetch master are stored in the buffer 71, the prefetch master has issued such a large number of access requests, so that it is highly probable that prefetch is effective. The prefetch control unit 73 may determine to perform prefetch when the prefetch master has issued a large number of access requests. Further, the prefetch control unit 73 may check a ratio of an access size of an access request currently issued by the prefetch master. There is a merge effect in a case where the prefetch master issues an access request of a maximum access size, so that the prefetch control unit 73 may determine to perform prefetch in such a case.

Regarding the QoS setting, it is highly probable that prefetched data is used when a band of the prefetch master is large. When bands of masters other than the prefetch master are low, an extension time until the data stored in the cache 72 is overwritten when prefetch is performed is long. The prefetch control unit 73 may determine to perform prefetch when the band of the prefetch master is large or the bands of masters other than the prefetch master are low. The prefetch control unit 73 may determine whether or not to perform prefetch by comprehensively examining items described above and the like.

[Conclusion]

In the present embodiment, the prefetch control unit 73 determines whether or not to perform prefetch based on an access size of an access request issued by a master and a grant state of an access right to the master. For example, when a master is expected to output a large number of read requests of the same access size to continuous addresses, it is possible to efficiently perform memory access by performing prefetch. In particular, in a case of a DDR memory or the like, efficiency may be significantly degraded unless a read size is greater than a certain value.

Fourth Embodiment

[Bus Generator]

Figure 7:
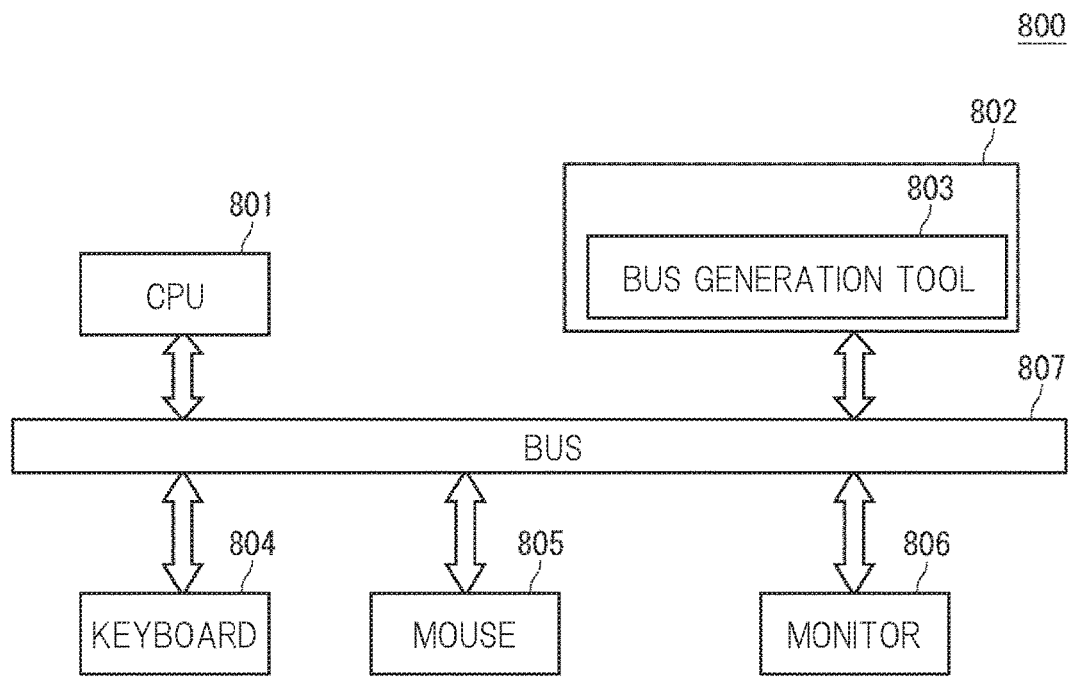
FIG. 7 is a block diagram showing a hardware configuration example of a bus generator.

Subsequently, a fourth embodiment will be described. In the present embodiment, a bus generator that generates bus circuit information in a semiconductor device from various setting information. FIG. 7 shows a hardware configuration example of a bus generator 800. The bus generator 800 is configured as a computer device including, for example, a CPU 801, a memory 802, a keyboard 804, a mouse 805, a monitor 806, and a bus 807. The memory 802 stores a bus generation tool 803 for causing a computer device to operate as the bus generator 800. In the computer device, the CPU 801 performs processing according to the bus generation tool 803 read from the memory 802, so that it is possible to cause the computer device to operate as the bus generator 800.

Figure 8:
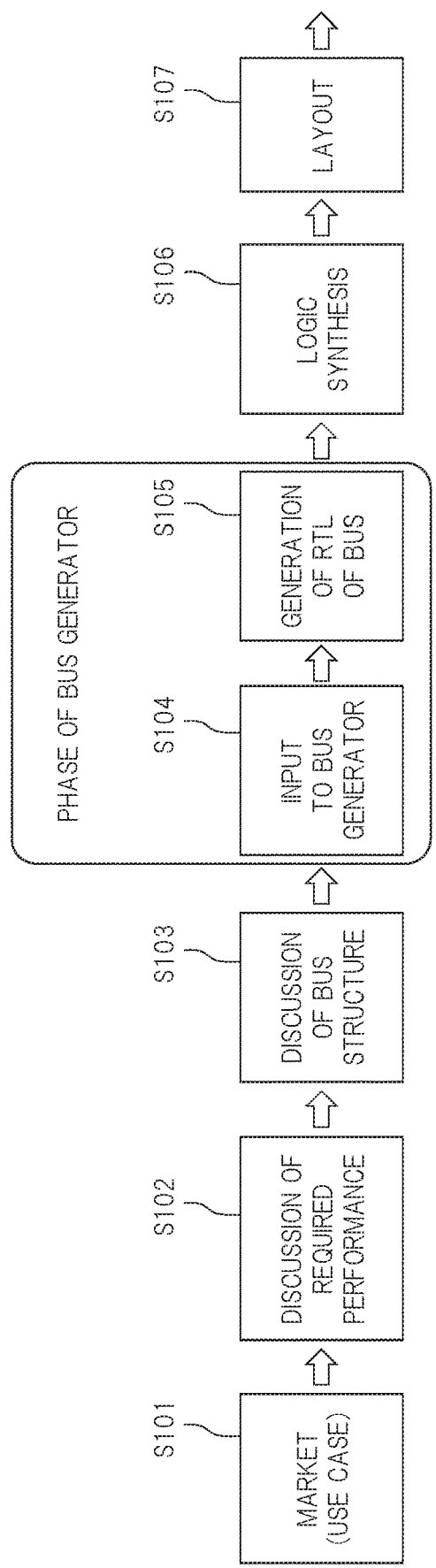
FIG. 8 is a flowchart showing an outline flow of a bus design.

FIG. 8 shows an outline flow of a bus design. First, a use case or the like in a market is considered (step S101), and performance required for a bus is discussed (step S103). Next, a bus structure is discussed according to a required performance and the like (step S103). The discussion of the bus structure includes, for example, a discussion of whether or not to use the central bus control unit 50 (see FIG. 1).

When the bus structure is determined, setting information required for the determined bus structure is inputted into the bus generator (step S104). The bus generator generates and outputs circuit information of a bus (step S105). For example, the circuit information is described in RTL (Register Transfer Level). Thereafter, the circuit information of the bus is logically synthesized (step S106), and subsequently, a layout design is performed (step S107). Steps S104 and S105 represent a phase in which design is performed by using the bus generator.

Figure 9:
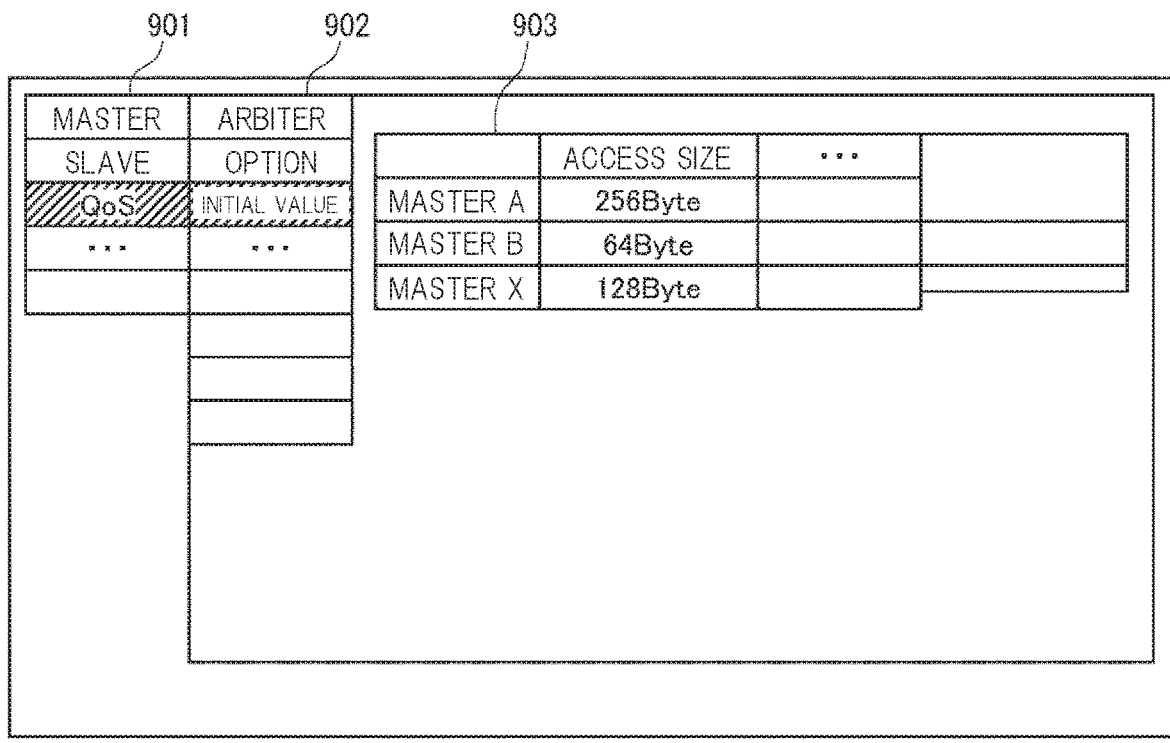
FIG. 9 is a diagram showing a screen example of inputting setting information.

FIG. 9 shows a screen example of inputting setting information. For example, a screen prompting input of setting information is displayed on the monitor 806 (see FIG. 7), and a user gives various settings to the bus generator 800 by using the keyboard 804 and the mouse 805. For example, when the user selects "QoS" from a menu 901 on the screen shown in FIG. 9, a sub-menu 902 is displayed. When the user selects "initial value" in the sub-menu 902, an input screen 903 for inputting an access size for each master is displayed. On the input screen 903, for example, the user can select a central control method, and further can select the presence or absence of cache, and the like. On the input screen 903, the user can input, for example, information to be set in the initial weight information register 581 (see FIG. 3), and the like.

For example, the user inputs information of an access destination of a master, information of a clock to be used, information related to a bus width, information related to functional safety, and the like into the bus generator 800 as information related to a master that outputs an access request for a memory. Further, the user inputs information of an address area, information of a clock to be used, information related to a bus width, information related to functional safety, and the like as information related to a slave that is accessed from a master. Further, the user inputs information that specifies a QoS method, detailed setting of each method, and the like as information related to arbiter.

Figure 10:
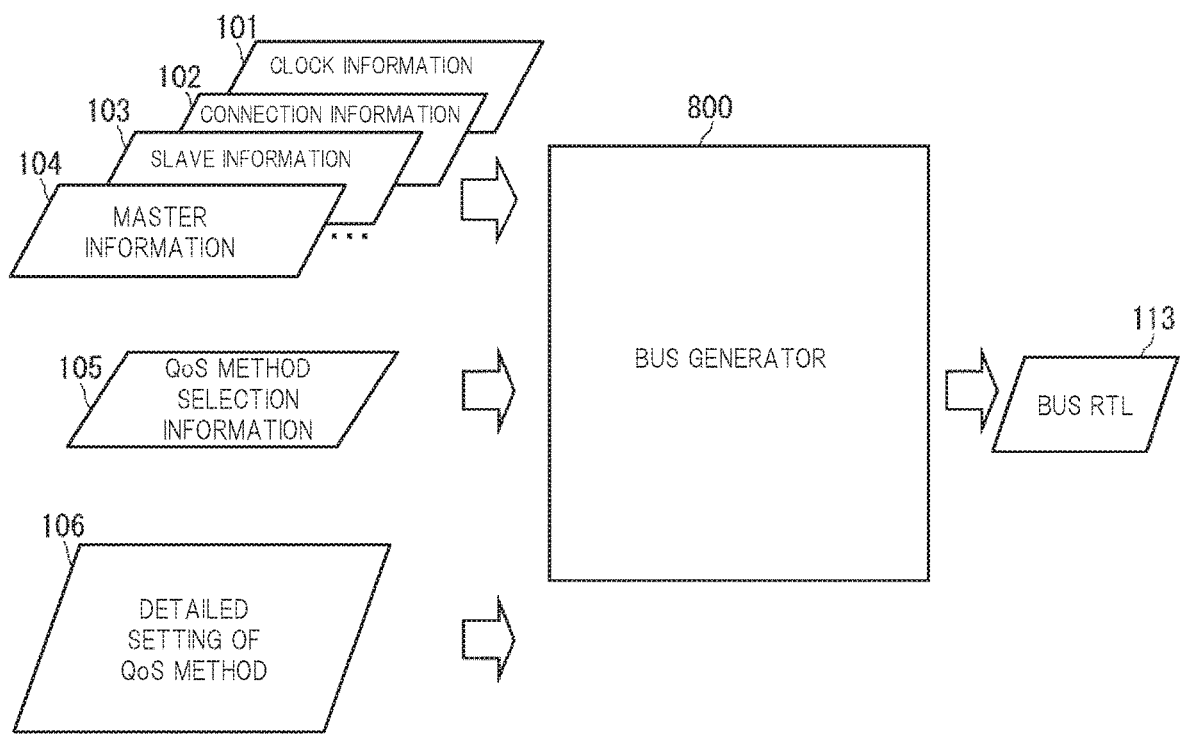
FIG. 10 is a block diagram showing input/output data to/from a bus generator.

FIG. 10 shows input/output data to/from the bus generator. The bus generator 800 has, for example, a bus structure information generation unit, a bus component generation unit, a central bus control unit generation unit, a sub-bus controller generation unit, a merge unit, and the like as functional blocks. Clock information 101, connection information 102, slave information 103, master information 104, QoS method selection information 105, and detailed setting information 106 of QoS method are inputted into the bus generator 800. These pieces of information are inputted through the setting information input screen shown in FIG. 9.

The bus generator 800 generates structure information of a bus that couples between a master and a slave by using the clock information 101, the connection information 102, the slave information 103, the master information 104, and the like. Further, the bus generator 800 generates circuit information of various bus components based on the generated structure information of a bus and circuit information of various functional blocks provided from, for example, a vendor that provides various IP cores.

The bus generator 800 generates circuit information of a central bus control unit that performs access control on an access request outputted by a master by using the structure information of a bus, the QoS method selection information 105, the circuit information of various functional blocks, and the like. The circuit information of the central bus control unit generated by the bus generator 800 shows, for example, a circuit configuration of the central bus control unit 50 shown in FIG. 2.

The bus generator 800 generates circuit information of a sub-bus controller that operates based on control of the central bus control unit by using the circuit information of the central bus control unit. The circuit information of the sub-bus controller represents, for example, a circuit configuration of the sub-bus controllers 22, 32, and 42 shown in FIG. 1. The bus generator 800 merges the circuit information of bus components, the circuit information of the central bus control unit, and the circuit information of the sub-bus controller and outputs bus circuit information 113. The bus circuit information 113 is, for example, information obtained by describing circuit portions related to the buses located between the masters and the memory 80 in the electronic device 10 shown in FIG. 1 in RTL.

[Conclusion]

In the present embodiment, the bus generator 800 is used to generate a bus system. It is possible to automatically generate, for example, a bus system located between the masters and the memory 80 of the electronic device 10 shown in FIG. 1 by inputting various setting information and the like into the bus generator 800.

While the invention made by the inventors has been specifically described based on the embodiments, it is needless to say that the present invention is not limited to the embodiments and may be variously modified without departing from the scope of the invention.

What is claimed is:

1. A semiconductor device comprising:
   a master that issues an access request to a memory;
   a sub-bus controller that is coupled to the master and receives the issued access request from the master;
   a memory controller that is coupled to the master through the sub-bus controller and accesses the memory according to the access request;
   a central bus control circuit that is coupled to the sub-bus controller, wherein the central bus control circuit grants an access right to the sub-bus controller,
   wherein when the access right is granted to the sub-bus controller from the central bus control circuit, the sub-bus controller 1) outputs the access request received from the master to the memory controller and 2) notifies the central bus control circuit of an access size of the access request to be outputted to the memory controller, the access size indicating a size of data to be read from the memory or a size of data to be written to the memory,
   wherein the central bus control circuit includes an initial weight information register in which a predicted weight corresponding to an access size of an access request to be issued by the master, and
   wherein the central bus control circuit is configured to:
      calculate, as a number of access rights that can be granted, a difference between a maximum number of access rights to be granted and a number of currently granted access rights;
      compare the number of access rights that can be granted with the predicted weight stored in the initial weight information register to determine whether to grant the access right to the sub-bus controller;
      when the access right is granted to the sub-bus controller, update the number of currently granted access rights stored by adding the predicted weight stored in the initial weight information register to the number of currently granted access rights; and
      when the central bus control circuit is notified of the access size from the sub-bus controller to which the access right has been granted, correct the updated number of currently granted access rights based on a difference between an actual weight corresponding to the notified access size and the predicted weight stored in the initial weight information register.

2. The semiconductor device according to claim 1, wherein, when the access right is not granted to the sub-bus controller the sub-bus controller prevents the access request from being outputted to the memory controller.

3. The semiconductor device according to claim 1, wherein the central bus control circuit stores, in a register, the number of currently granted access rights.

4. The semiconductor device according to claim 1, wherein the central bus control circuit stores the access size of the access request to be issued by the master associated with the predicted weight, and
wherein the central bus control circuit acquires the predicted weight according to the notified access size by referring to the initial weight information storage register.

5. The semiconductor device according to claim 1, wherein the central bus control circuit is configured to:
   store, in an access size history storage, a history of the access sizes notified from the sub-bus controller; and
   generates a weight according to an estimate value of the access size of the access request issued by the master based on the history of the access sizes stored in the access size history storage, and
wherein the central bus control circuit compares the number of access rights that can be granted with the generated weight to determine whether to grant the access right to the sub-bus controller.

6. The semiconductor device according to claim 1,
wherein the memory controller has a request buffer that receives and stores the access request, and when a memory access based on the access request stored in the request buffer is processed and an entry of the request buffer is released, the memory controller outputs a release notification signal indicating that the request buffer is released to the central bus control circuit and notifies the central bus control circuit of an access size of the processed access request, and
wherein when the central bus control circuit receives the release notification signal from the memory controller, the central bus control circuit subtracts the actual weight according to the access size notified from the memory controller from the number of currently granted access rights.

7. The semiconductor device according to claim 1,
wherein when the sub-bus controller is granted with the access right from the central bus control circuit and does not receive the access request from the master, the sub-bus controller returns the access right to the central bus control circuit, and
wherein when the access right is returned to the central bus control circuit, the central bus control circuit subtracts the predicted weight stored in the initial weight information register from the number of currently granted access rights.

8. The semiconductor device according to claim 1,
wherein the master comprises a first master,
wherein the sub-bus controller comprises a first sub-bus controller,
wherein the semiconductor device further comprises:
  a second master that issues an access request to the memory;
  an interconnect that is coupled between the first sub-bus controller and the memory controller; and
  a second sub-bus controller that is coupled between the second master and the interconnect,
wherein the interconnect arbitrates the access requests issued by the first master and the second master, and that outputs the arbitrated access request to the memory controller.

9. The semiconductor device according to claim 1,
wherein the memory controller comprises a cache,
wherein the memory controller controls prefetch for acquiring data greater in size than the access size data of the access request from the memory and storing the acquired data in the cache when the access request is a read,
wherein the memory controller determines whether or not to perform prefetch based on the access size of the access request issued by the master and a grant state of the access right to the sub-bus controller.

10. The semiconductor device according to claim 1, wherein, when the number of access rights that can be granted is greater than or equal to the predicted weight stored in the initial weight information register, the central bus control circuit determines that the access right can be granted to the sub-bus controller.

11. The semiconductor device according to claim 1, wherein, when the number of access rights that can be granted is smaller than the predicted weight stored in the initial weight information register, the central bus control circuit determines that the access right cannot be granted to the sub-bus controller.

12. The semiconductor device according to claim 5, wherein the central bus control circuit uses an average value of the access sizes stored in the access size history storage as the estimate value of the access size.

13. The semiconductor device according to claim 5, wherein the central bus control circuit uses a most recent access size stored in the access size history storage as the estimate value of the access size.

* * * * *